United States Patent
Handley (10) Patent No.: US 8,266,077 B2
(45) Date of Patent: *Sep. 11, 2012

(54) METHOD OF ANALYZING DOCUMENTS

(75) Inventor: John C. Handley, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1016 days.

This patent is subject to a terminal disclaimer.

(21) Appl. No.: 12/241,903

(22) Filed: Sep. 30, 2008

(65) Prior Publication Data

US 2009/0037390 A1    Feb. 5, 2009

Related U.S. Application Data

(63) Continuation of application No. 11/127,679, filed on May 12, 2005, now Pat. No. 7,451,124.

(51) Int. Cl.
*G06F 17/00* (2006.01)
*G06N 5/00* (2006.01)
(52) U.S. Cl. ............... 706/12; 715/210; 235/404
(58) Field of Classification Search .............. 707/3
See application file for complete search history.

(56) References Cited

U.S. PATENT DOCUMENTS

| 4,821,029 A | 4/1989 | Logan et al. |
| 6,611,825 B1 * | 8/2003 | Billheimer et al. .............. 706/45 |
| 2005/0078869 A1 | 4/2005 | Kim |
| 2005/0198068 A1 * | 9/2005 | Mukherjee et al. ........ 707/104.1 |
| 2005/0210008 A1 * | 9/2005 | Tran et al. .......... 707/3 |

OTHER PUBLICATIONS

Berry et al., "Understanding Search Engines, Mathematical Modeling and Text Retrieval", Society for Industrial and Applied Mathematics, 1999, pp. 31-44, Philadelphia, Pennsylvania.
Landauer et al., "An Introduction to Latent Semantic Analysis", Discourse Processes, 1998, pp. 259-284.
Manning et al., "Foundations of Statistical natural language Processing", MIT Press, 1999, pp. 529-574, Cambridge, Massachusetts.

* cited by examiner

*Primary Examiner* — Omar Fernandez Rivas
*Assistant Examiner* — Kalpana Bharadwaj
(74) *Attorney, Agent, or Firm* — Fox Rothschild LLP (57) ABSTRACT

A method for analyzing documents is disclosed. The method compares concepts consisting of groups of terms for similarity within a corpus of document, clusters documents that contain certain concept term sets together. It may also rank the documents within each cluster according to the frequency of term co-occurrence within the concepts.

20 Claims, 8 Drawing Sheets

METHOD OF ANALYZING DOCUMENTS

RELATED APPLICATION AND CLAIM OF PRIORITY

This application is a continuation of U.S. patent application Ser. No. 11/127,679 filed May 12, 2005 and claims the benefit and priority of that application, which is incorporated herein by reference in its entirety.

TECHNICAL FIELD

The disclosed embodiments generally relate to methods of analyzing groups of documents. More particularly, the disclosed embodiments relate to methods for searching and organizing a collection or corpus of documents into various groups or clusters according to concepts that occur within the documents.

BACKGROUND

Information retrieval methods exist for analyzing documents in a document repository and retrieving specific documents that are responsive to a query. For example, a simple information retrieval technique is word or term searching. Term searching involves a user querying a corpus of documents containing information for a specific term or word. A resultant solution set of documents is then identified as containing the search term. Single term searching is extremely fast and efficient because little computational effort is involved in the query process, but it can result in a relatively large solution set of unranked documents being returned. Alternatively, the results may be ranked based on a weighted sum of matching words. Many of the documents may not be relevant to the user because, although the term occurs in each solution set document, the term is out of context with the user's intended meaning. Further, even if all of the resultant documents use the search term in the proper context, the user has no way of judging which documents in the solution set are more relevant than others. Thus, the user often must perform a secondary search for a more relevant solution set of documents. Additionally, a user must have some knowledge of the subject matter of the search topic for the search to be efficient (e.g., a less relevant word in a query could produce a solution set of less relevant documents and cause more relevant documents in the solution set to be ranked lower than more relevant documents).

A logical improvement to single term searching is multiple, simultaneous term searching using "Boolean term operators," or simply, Boolean operators. A Boolean retrieval query passes through a corpus of documents by linking search terms together with Boolean operators such as AND, OR and NOT. The solution set of documents is generally smaller than the set that would result from single term searches, and all returned documents are typically ranked equally with respect to relevance. The Boolean method of term searching is a widely used information retrieval process, and it is often used in Internet search engines because it is fast, uncomplicated and easy to implement in a remote online environment. However, the Boolean search method carries with it many of the shortcomings of term searching. The user has to have some knowledge of the search topic for the search to be efficient in order to avoid relevant documents being ranked as non-relevant and visa versa. Furthermore, since the returned documents are not ranked, the user may be tempted to reduce the size of the solution set by including more Boolean linked search terms. However, increasing the number of search terms in the query narrows the scope of the search and thereby increases the risk that a relevant document is missed. Still again, all documents in the solution set are ranked equally.

Other information retrieval processes have extended and refined the Boolean term searching method to attempt to rank the resultant documents. Such processes do not necessarily reduce the size of the solution set. One such method of ranking the documents is by term weighting the query terms and/or term weighting the occurrence of terms in the solution set of documents by frequency. Expanded term weighting operations make ranking of documents possible by assigning weights to search terms used in the query. Documents that are returned with higher ranking search terms are themselves ranked higher in relevance. However, a more useful variation of term weighting is by occurrence frequency in a resultant document database, thereby allowing the documents in the solution set to be ranked. A higher term occurrence frequency in a resultant document is indicative of relevance. Boolean searching variants that allow for term frequency based document ranking have a number of drawbacks, one of which is that longer documents have a higher probability of being ranked higher in the solution set without a corresponding increase in relevance. Additionally, because the occurrence of the term is not context related, higher ranking documents are not necessarily more relevant to the user. Moreover, if the user does not have an understanding of the subject matter being searched, the combination of Boolean logic and term weighting may exclude the most relevant documents from the solution set and under-rank the documents that are most relevant to the subject matter.

Information retrieval methods have been devised that combine Boolean logic with other techniques such as content-based navigation, where shared terms from previously obtained documents are used to refine and expand the query. While each of the above described improvements provide some benefit to the user, the solution set of documents does not optimally convey the right information to a user if the user does not have an understanding of the subject matter being searched. Further, other ranking tools, such as word stemming and thesaurus techniques, are language dependent and thus have limited applicability.

Figure 1:
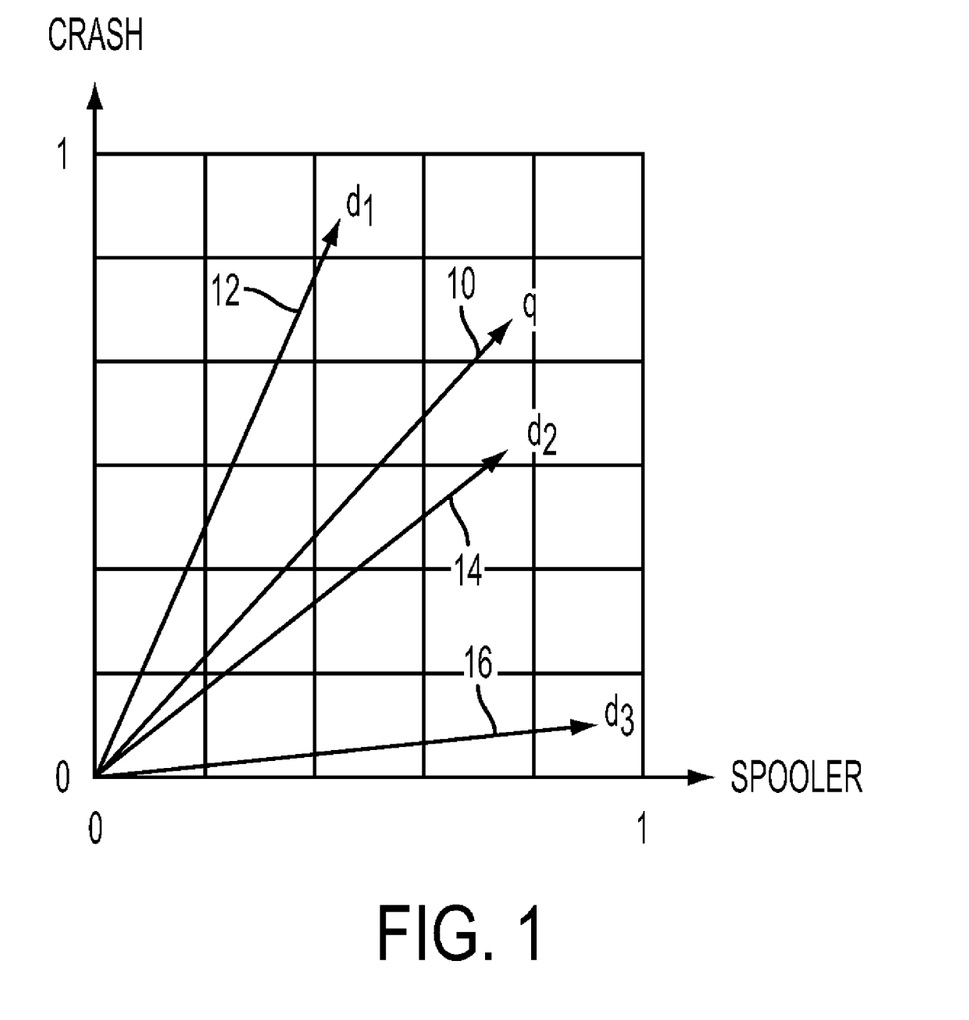
FIG. 1 is a graphic illustration of an example of vector analysis.

An information retrieval method with rising popularity is the use of the vector space model, where documents and queries are represented in a high-dimensional space in which each dimension of the space corresponds to a word in the document collection. The most relevant documents for the query are expected to be those represented by the vectors closest to the query. Closeness may be calculated by looking at angles and choosing documents that enclose the smallest angle with the query vector. For example, the graph shown in FIG. 1 depicts a vector space with two dimensions corresponding to the words "crash" and "spooler." Represented in the space are a query vector 10, and three document vectors $d_1$ 12, $d_2$ 14, and $d_3$ 16 with the following coordinates. The coordinates, or term weights, of each vector are derived from occurrence counts within the documents. For example, crash may have only a passing reference in $d_1$, but there may be several occurrences of spooler. Thus, crash receives a higher weight than spooler. Since document $d_2$ has the smallest angle with q, it is the top-ranked document in response to the query crash spooler. Both terms (crash and spooler) are salient in $d_2$ and therefore have high weights, and although the other two documents also mention both terms, one of the terms is not a centrally important term in the overall document.

Documents are ranked according to similarity with the query as measured by the cosine measurement, or the normalized correlation coefficient. This calculation computes how well the occurrence of a term correlates to both the query and the document. For example, if the cosine of a query vector q and a first document vector $d_1$ is greater than the cosine of the query vector q and a second document vector $d_2$, then the first document may be ranked higher than the second document because $d_1$ is closer to the query vector than $d_2$. For additional background relating to space modeling, see e.g., *Understanding Search Engines Mathematical Modeling and Text Retrieval*, Michael W. Berry, Murray Browne, Society for Industrial and Applied Mathematics, (1999).

Latent Semantic Analysis (LSA) is a technique that helps to identify the contextual meaning of words or phrases in a document by using vector analysis to project queries and documents into a space which helps to infer semantic relations between terms. With LSA, a database is searched using a query, which produces result items. The result items are clustered into logical categories, and the result items within each category are ranked based on the frequency of the occurrence of relevant words in each of the result items. The frequency of the occurrence of words for a given result item may correspond to the number of unique terms that are contained in the given result item. Co-occurring terms are projected onto the same dimensions; non-co-occurring terms are projected onto different dimensions. Thus, the product of a query vector and a document vector may be relatively high (in terms of cosine similarity) even if they do not share any terms, as long as their terms are semantically similar according to the co-occurrence analysis. Accordingly, LSA permits dimensionality reduction, thereby taking a set of objects that would exist in a high-dimensional space if traditional vector analysis were used, and representing them in a low-dimensional space.

LSA applies a well-known mathematical technique called Singular Value Decomposition (SVD) to a word-by-document matrix. SVD is a form of factor analysis, or the mathematical generalization of which factor analysis is a special case. In SVD, a rectangular matrix is created from the product of a number, typically three, of other matrices. One component matrix is a two-dimensional matrix in which rows correspond to search terms, columns correspond to documents, and values correspond to numbers of occurrences of the terms within the documents. This matrix may be multiplied by other matrices that, for example, predict or identify the expected number of terms or related terms in the document in order to form a reconstructed matrix that measures the contextual relation of search terms. See, *An Introduction to Latent Semantic Analysis*, Thomas K. Landauer, Peter W. Foltz, Darrell Laham, published in *Discourse Processes*, 25, 259-284 (1998).

Thus, LSA provides a means for extracting and representing the contextual-usage meaning of words by statistical computations applied to a large corpus of text. Information content is defined by more than just its mere terms but is also characterized by the context in which a specific term is given. There is an underlying latent semantic structure in word usage that is partially hidden or obscured by the variability of word choice. An important concept is that the similarity of meaning of terms to each other is based on the context in which that term appears and the context in which that term does not appear. LSA determines similarity of meaning of terms by context in which the terms are used and represents the terms and passages by statistical analysis of a large information corpus.

LSA represents the terms taken from an original corpus of information or any subset of terms contained in the original corpus, as individual points in a high dimensional semantic space. A semantic space is a mathematical representation of a large body of terms, and every term, combination of terms or sub-combinations of a term can be represented as a unique high-dimensional vector at a point in semantic space. The similarity of two terms can be understood by comparing the terms' vectors. Quantitative similarity values are defined by the cosine of the angle between the term vectors representing the terms in the semantic space. More importantly, this comparison is valid only in the defined semantic space for the corpus of information. LSA utilizes concepts rather than terms contained in the documents for analyzing the latent semantic structure of documents. Thus, LSA allows for information retrieval on the basis of concepts contained in the document with respect to other documents in the corpus rather than terms in the documents of the corpus.

Latent Semantic Indexing (LSI) is the application of LSA principles in a statistical information retrieval methodology. LSI focuses upon the relationship between documents and terms to register recurring patterns of semantic structure. Co-occurrences of terms are given higher weights than singular occurrences because the object of semantic indexing is to recognize which terms reappear most often in which parts of a document's structure. It has been demonstrated that there are a few constantly recurring structural patterns within sentences and these patterns occur at the level in which terms and their articles interrelate. The recurrence of these patterns is "latent" because they are inherent in grammatical structure and "semantic" because they define linguistic contextual meaning. In other words, through the pattern of co-occurrences of words, LSI is able to infer the structure of relationships between articles and words that define context and meaning by the relationship between structure and concept. For more information about LSI, see e.g., *Foundations of Statistical Natural Language Processing*, Christopher D. Manning, Hinrich Schutze, The MIT Press, 1999.

One problem with current methods of information retrieval as described above is that, even with traditional LSA or LSI methods, the searches often retrieve semantically uninteresting words. A need exists for a method to compare documents not simply based on word occurrences, but rather on a higher level of concept occurrence and co-occurrence, where a concept is defined by two or more correlated terms. It would then be advantageous to cluster together documents having more than one concept and compare and rank the documents according to the frequency of occurrences of particular terms within a concept.

An important application of information retrieval is to extract information from service logs written by product support staff. In an enterprise that manufactures complex and expensive machines and systems, service contracts are offered to customers. When machines or systems encounter problems, customers notify customer support staff who enter pertinent information about the problem into a service log. Field service engineers read these logs and update them with technical observations and remedies. These logs provide a source of information for discovering and tracking systemic product problems. Information retrieval methods are used because the information is in textual form. However, to date methods of analysis of service logs for discovering product have been limited to manual analysis, which is time-consuming, expensive and prone to error.

The present disclosure describes attempts to solve one or more of the above-listed problems.

SUMMARY

In an embodiment, a method of analyzing a plurality of documents includes collecting and filtering terms from a plurality of documents, identifying a term-frequency vector for each of the documents, and identifying a term-frequency matrix, wherein rows of the matrix comprise values for the term-frequency vectors. The method may also include projecting the term-frequency matrix onto a lower dimensional space using latent semantic analysis to create a transformed term matrix. A correlation matrix may be created using the rows of the transformed term matrix. A concept graph of connected components may be created, using a concept threshold, where each connected component is a set of terms that corresponds to a concept. The method may also include clustering documents that contain concept term sets together.

In various embodiments, the filtering may be performed with reference to a set of stop words. The method may use a processor and memory, and the plurality of documents may be stored in the memory. The set of term-frequency vectors for the documents may be maintained as rows and columns in a term-frequency matrix. The columns and rows of the correlation matrix may correspond to terms that are the terms of the transformed term matrix, and a concept may include highly correlated terms. The correlation matrix may include a correlation higher than the concept threshold become vertices of a concept graph.

In various embodiments, the method may include ranking the documents within each cluster according to the number of occurrences of concept terms within a term set. Singular value decomposition or another appropriate method may be used to express the term-frequency matrix as a product of at least a document matrix, a diagonal matrix of eigenvalues, and a term matrix. The entries of the diagonal matrix may be the eigenvalues of the term-frequency matrix in decreasing order, and the rows of the term matrix may correspond to vectors corresponding to term frequencies in a transformed space. In various embodiments, dimensionality reduction may be performed by trimming the matrices in the decomposition by selecting the m greatest diagonal elements of the diagonal matrix in the composition and selecting the m corresponding rows of the term matrix and multiplying a trimmed diagonal matrix by a trimmed term matrix. Optionally, the entries of the correlation matrix may be values from about −1 to about 1. In such a case, the concept threshold may be less than or equal to 1, and terms that have correlation higher than the concept threshold may form the vertices of the concept graph.

In alternate embodiments, a method for determining product problems from field service logs includes collecting and filtering terms from a plurality of service logs, identifying a term-frequency vector for each of the logs, and identifying a term-frequency matrix, wherein rows of the matrix comprise values for the term-frequency vectors. The method may also include projecting the term-frequency matrix onto a lower dimensional space using latent semantic analysis to create a transformed term matrix. The method may also include determining a correlation matrix using the rows of the transformed term matrix, and creating a concept graph of connected components using a concept threshold, where each connected component comprises a set of terms that corresponds to a concept. The method may also include clustering documents that contain concept term sets together, and for each cluster and corresponding term sets, ranking logs in each cluster by frequency of occurrence of terms in the concept term set. The method may also include identifying one or more logs that relate to a product problem based on the ranking of the log or logs, and/or identifying one or more problems based on the frequency of occurrence of terms in the concept term set.

In an alternate embodiment, a method of analyzing a plurality of documents includes collecting and filtering terms from a plurality of documents, identifying a term-frequency vector for each of the documents, and identifying a term-frequency matrix, wherein rows of the matrix comprise values for the term-frequency vectors. The method may include projecting the term-frequency matrix onto a lower dimensional space using latent semantic analysis, to create a transformed term matrix, developing a correlation matrix using the rows of the transformed term matrix, and creating a dendrogram of related concepts using a function of the correlation matrix, where branches of the dendrogram correspond to related concepts. The method may also include clustering documents that contain concept term sets together.

BRIEF DESCRIPTION OF THE DRAWINGS

Aspects, features, benefits and advantages of the embodiments of the present invention will be apparent with regard to the following description, appended claims and accompanying drawings where:

DETAILED DESCRIPTION

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope.

It must also be noted that as used herein and in the appended claims, the singular forms "a," "an," and "the" include plural references unless the context clearly dictates otherwise. Thus, for example, reference to a "document" is a reference to one or more physical documents, electronic files, and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments of the invention, the preferred methods, materials, and devices are now described. All publications mentioned herein are incorporated by reference. Nothing herein is to be construed as an admission that the invention is not entitled to antedate such disclosure by virtue of prior invention.

The disclosed embodiments relate to methods for searching and organizing a collection or corpus of documents into various groups or clusters according to concepts that occur within the documents. A document may include a physical document, such as a paper, book or article, or it may include an electronic source of information, such as a computer file, a representation of a video screen or another electronic storage medium.

Figure 2:
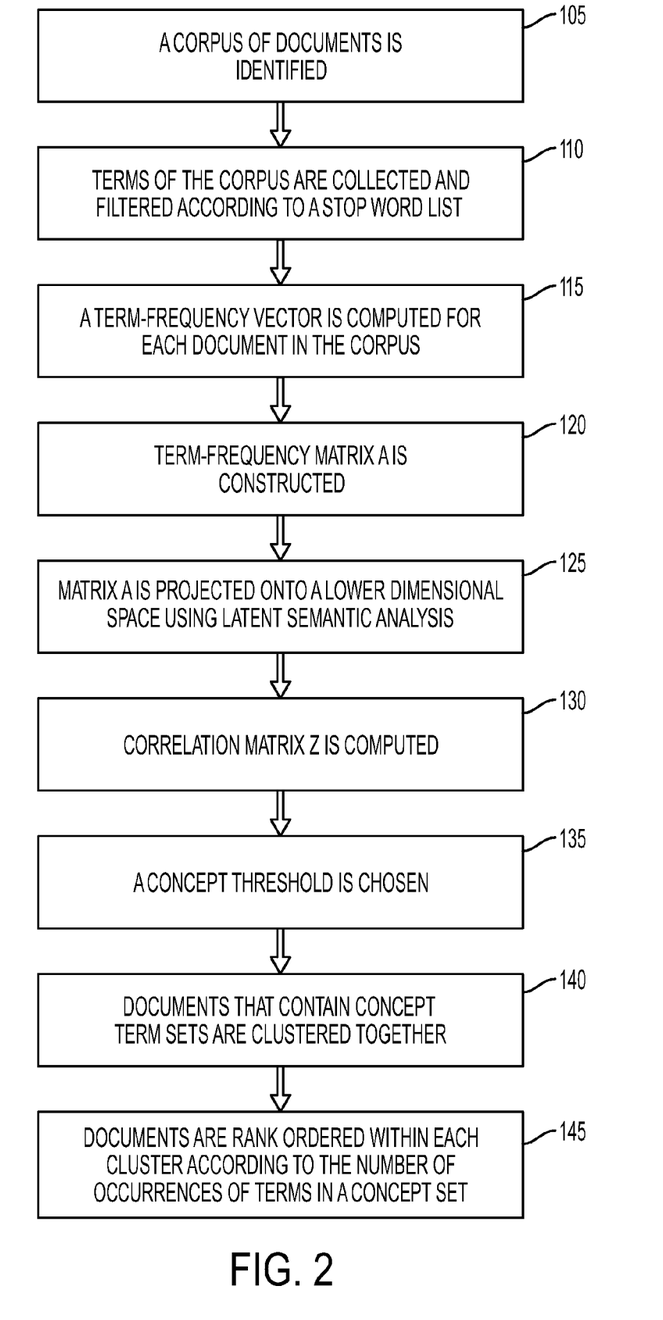
FIG. 2 depicts a flow diagram for an exemplary method of analyzing documents according to an embodiment.
Figure 3:
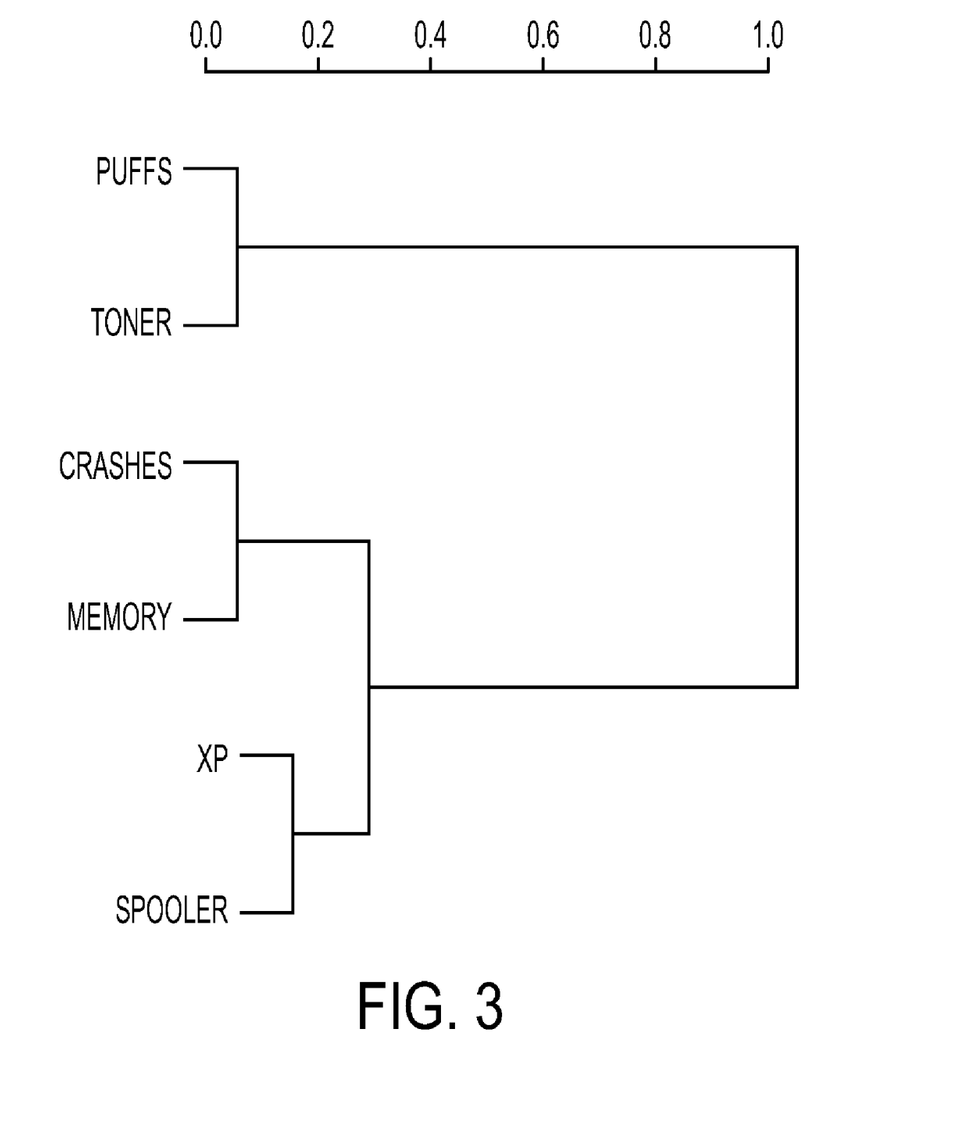
FIG. 3 is a graphic illustration of an example of hierarchical agglomerative clustering.
Figure 4A:
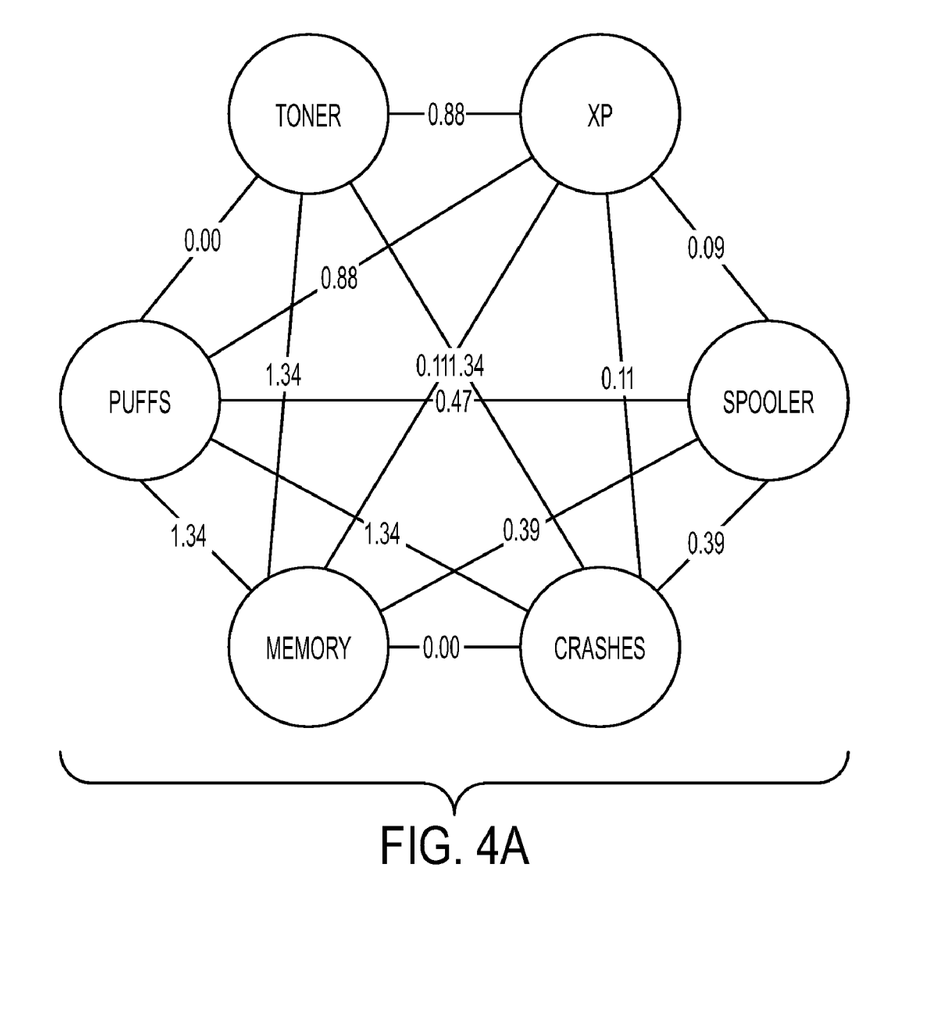
FIGS. 4a-4d are diagrams showing a term matrix in graphic form.
Figure 4B:
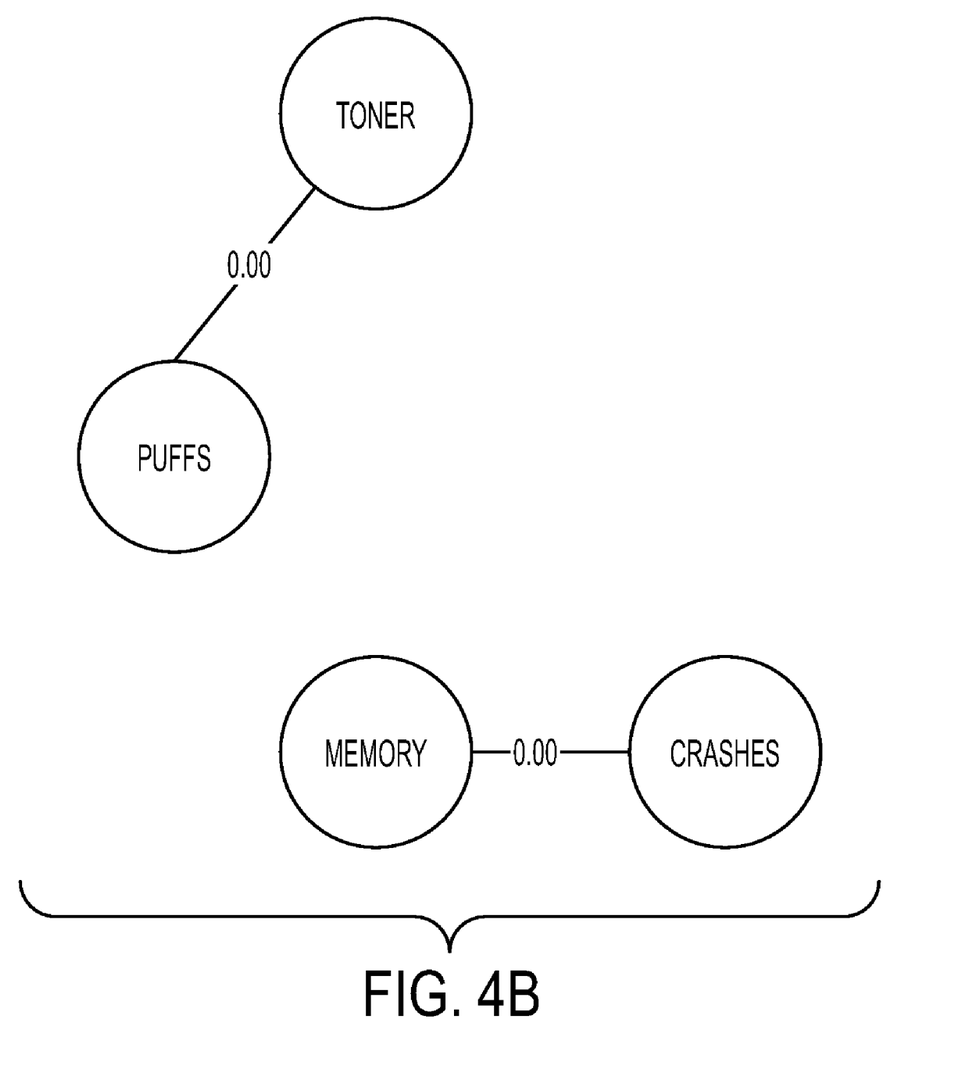
Figure 4C:
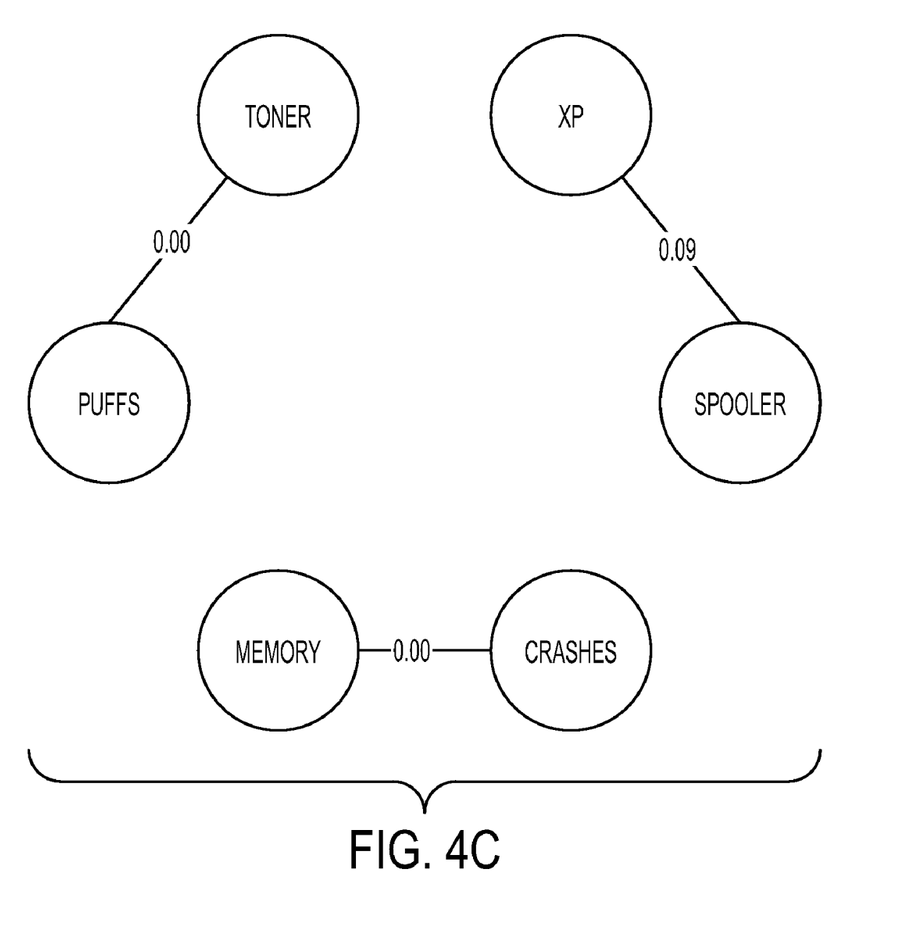
Figure 4D:
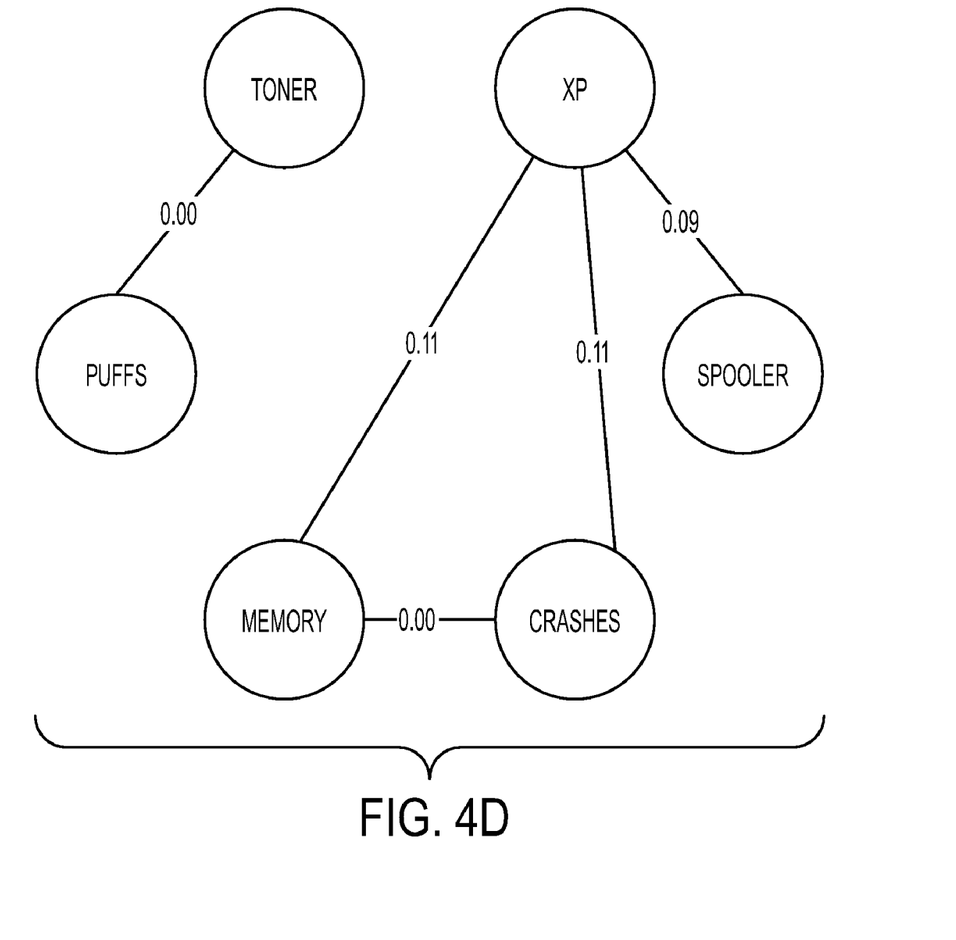

FIG. 2 depicts a flow diagram for an exemplary method of comparing concepts for similarity within a corpus of documents and ranking the documents according to concept similarity. Initially, a corpus, or collection, of documents may be identified as relevant to a particular query 105. The corpus may include, for example, electronic files corresponding to books, magazine articles, memoranda, magazines, letters, e-mails or other documents. Each file may include representations of some or all of the text of the original documents. The corpus may be stored on a computer-readable or other medium, such as a database, on a server or otherwise. Some or all of the terms of the corpus may be collected and filtered according to a stop word list 110. The stop word list may be a list of grammatical or function words that are deemed unlikely to be useful for searching. These words may have important semantic functions in English, but they may be considered to rarely contribute information if the search criterion is a simple word-by-word match. A stop word list may contain, for example, words such as, but not limited to, "the," "a," names of people, numbers (except default codes), and dates.

For each document in the corpus, a term-frequency vector is computed that contains the frequency of filtered terms in the document 115. For example, FIG. 1 shows the terms "crash," and "spooler," in a vector space with two dimensions. One query, q, and three documents, $d_1$, $d_2$, and $d_3$, are represented in the space by a query vector 10 and three document vectors, 12, 14 and 16. The two dimensions correspond to the terms "crash," and "spooler." Since the vector 14 document $d_2$ has the smallest angle with the vector 10 for q, $d_2$ is the top-ranked document in response to the query "crash, spooler." A similar vector space could be computed for multiple dimensions, depending on the number of filtered terms. For example, the terms "crash," "spooler," and "memory" could be computed in a vector space with three dimensions.

A term-frequency matrix A is constructed, where the set of term-frequency vectors in a corpus is maintained as rows and columns 120. Thus, matrix A may have as many rows as documents in the corpus and as many columns as filtered terms, or vice versa. Thus, continuing the above example, the following Matrix A may be computed for the terms "XP", "puffs", "spooler", "crashes," "memory," and "toner," in exemplary documents $d_1$, $d_2$, $d_3$ and $d_4$.

|   |   | XP | puffs | spooler | crashes | memory | toner |
|---|---|----|-------|---------|---------|--------|-------|
|   | $d_1$ | 1 | 0 | 1 | 0 | 0 | 0 |
| A = | $d_2$ | 0 | 2 | 0 | 0 | 0 | 3 |
|   | $d_3$ | 2 | 0 | 2 | 1 | 2 | 0 |
|   | $d_4$ | 2 | 0 | 2 | 1 | 2 | 0 |

Matrix A may be projected onto a lower dimensional space using Latent Semantic Analysis 125. In other words, a six-dimensional space such as that of the above example could be projected onto a three-dimensional space using LSA. In practice, matrix A may have any number of rows and columns, such as hundreds or thousands of rows corresponding to a set (or corpus) of documents and hundreds, thousands, or tens of thousands of columns corresponding to possible terms that can occur in a document. In this procedure, singular value decomposition (SVD) may be used to decompose the term frequency matrix A into the product of three matrices, thereby expressing matrix A as a document matrix D containing vector values, a diagonal matrix S of eigenvalues (i.e., scale values by which the vector values are multiplied), and a term matrix T, such that A=DST' where T' is the transpose of matrix T. Dimensionality may be understood by subscripts, such that $A_{(d \times t)} = D_{(d \times n)} S_{(n \times n)} T'_{(t \times n)}$, where A has t rows and d columns, and so on. In this case, t=number of terms, d=number of documents, and n=min(t,d).

In an embodiment, the entries of the diagonal matrix S may include the eigenvalues of matrix A in decreasing order. The rows of T may be vectors corresponding to term frequencies in a transformed space. In the above example, the resulting matrices are:

$$D = \begin{matrix} -0.10 & 0.00 & 0.16 & 0.98 \\ 0.00 & 1.00 & 0.00 & 0.00 \\ -0.97 & 0.00 & -0.23 & -0.07 \\ -0.22 & 0.00 & 0.96 & -0.18 \end{matrix}$$

$$S = \begin{matrix} 11.50 & 0.00 & 0.00 & 0.00 \\ 0.00 & 3.61 & 0.00 & 0.00 \\ 0.00 & 0.00 & 2.73 & 0.00 \\ 0.00 & 0.00 & 0.00 & 0.64 \end{matrix}$$

$$T = \begin{matrix} -0.22 & 0.00 & 0.59 & 0.78 \\ 0.00 & 0.55 & 0.00 & 0.00 \\ -0.98 & 0.00 & -0.16 & -0.14 \\ -0.02 & 0.00 & 0.35 & -0.27 \\ -0.04 & 0.00 & 0.70 & -0.55 \\ 0.00 & 0.83 & 0.00 & 0.00 \end{matrix}$$

and $$T' = \begin{matrix} -0.22 & 0.00 & -0.98 & -0.02 & -0.04 & 0.00 \\ 0.00 & 0.55 & 0.00 & 0.00 & 0.00 & 0.83 \\ 0.59 & 0.00 & -0.16 & 0.35 & 0.70 & 0.00 \\ 0.78 & 0.00 & -0.14 & -0.27 & -0.55 & 0.00 \end{matrix}$$

Dimensionality reduction may be performed by selecting a number m<n, and trimming the matrices in the decomposition, i.e., by deleting the coefficients in the diagonal matrix, ordinarily but not necessarily starting with the smallest. Through the use of SVD, some words that have similar co-occurrence patterns are projected (or collapsed) onto the same dimension. As such, some topically similar documents and queries will come out as similar even if different words are used for describing the topic. In an embodiment, the ratio of m:n may be about 1 to about 40. Thus, in an example, a corpora consisting of about 1200 documents and 1100 terms could have a workable value of m that is 30. Any other value for m<n may be used, however. In the above example, when m=3, the new matrices S and T' are:

$$S = \begin{matrix} 11.50 & 0.00 & 0.00 \\ 0.00 & 3.61 & 0.00 \\ 0.00 & 0.00 & 2.73 \end{matrix}$$

$$T' = \begin{matrix} -0.22 & 0.00 & -0.98 & -0.02 & -0.04 & 0.00 \\ 0.00 & 0.55 & 0.00 & 0.00 & 0.00 & 0.83 \\ 0.59 & 0.00 & -0.16 & 0.35 & 0.70 & 0.00 \end{matrix}$$

Thus, in an embodiment the transformed term matrix is X=ST'

A correlation matrix Z may be computed from the rows or columns of transformed term matrix X 130. Entries of matrix Z may be values from about −1 to about 1. The columns and rows of correlation matrix Z correspond to terms that are the terms of the transformed term matrix. For example, the following matrix shows a correlation matrix using the terms "crashes," "spooler," and "memory" from the above example, plus the additional terms "toner," "puffs," "windows," and "XP."

|  | XP | puffs | spooler | crashes | memory | toner |
|---|---|---|---|---|---|---|
| XP | 1.00 | 0.12 | 0.91 | 0.89 | 0.89 | 0.12 |
| puffs | 0.12 | 1.00 | 0.53 | −0.34 | −0.34 | 1.00 |
| spooler | 0.91 | 0.53 | 1.00 | 0.61 | 0.61 | 0.53 |
| crashes | 0.89 | −0.34 | 0.61 | 1.00 | 1.00 | −0.34 |
| memory | 0.89 | −0.34 | 0.61 | 1.00 | 1.00 | −0.34 |
| toner | 0.12 | 1.00 | 0.53 | −0.34 | −0.34 | 1.00 |

Terms that are highly correlated are closer together in a latent, concept space. Correlations are converted to distances by subtracting them from 1 so that a correlation of 1 corresponds to a distance of 0 as seen in the distance matrix below.

|  | XP | puffs | spooler | crashes | memory | toner |
|---|---|---|---|---|---|---|
| XP | 0.00 | 0.88 | 0.09 | 0.11 | 0.11 | 0.88 |
| puffs | 0.88 | 0.00 | 0.47 | 1.34 | 1.34 | 0.00 |
| spooler | 0.09 | 0.47 | 0.00 | 0.39 | 0.39 | 0.47 |
| crashes | 0.11 | 1.34 | 0.39 | 0.00 | 0.00 | 1.34 |
| memory | 0.11 | 1.34 | 0.39 | 0.00 | 0.00 | 1.34 |
| toner | 0.88 | 0.00 | 0.47 | 1.34 | 1.34 | 0.00 |

The distances can be used to plot a tree or graphic representation of a branching diagram representing a hierarchy of categories based on degress of similarity or shared characteristics (i.e., a dendrogram) using a method known in the art as hierarchical agglomerative clustering. The graph may be created on a screen or printer, or it may be virtually created in memory using data stored in a file or electronic medium. FIG. 4 shows such a dendrogram for this example. In the example of FIG. 4, we see that there are two major concepts, one associated with toner and puffs and another having to do with spooler, XP, crashes and memory. The first exemplary concept refers to a xerographic problem in an electrophotographic printer. The second concept refers to a software problem in which a print spooler somehow uses too much memory and causes some software program to crash under the XP operating system. Further, we see two sub-concepts: crashes and memory and XP and spooler. The two major concepts are shown to have little connection because they are joined only at the root of the dendrogram. The closer one gets to the root of the tree, the more terms are included and the broader the concepts that are represented.

Each concept is represented by a set of terms that are close together in a concept space. In an embodiment, terms are close together if they are highly correlated in a latent space. A high correlation can be any desired threshold, such as a correlation value of 0.7 or higher, 0.75 or higher, 0.8 or higher, 0.85 or higher, 0.9 or higher, 0.95 or higher, or any desired threshold.

Figure 5:
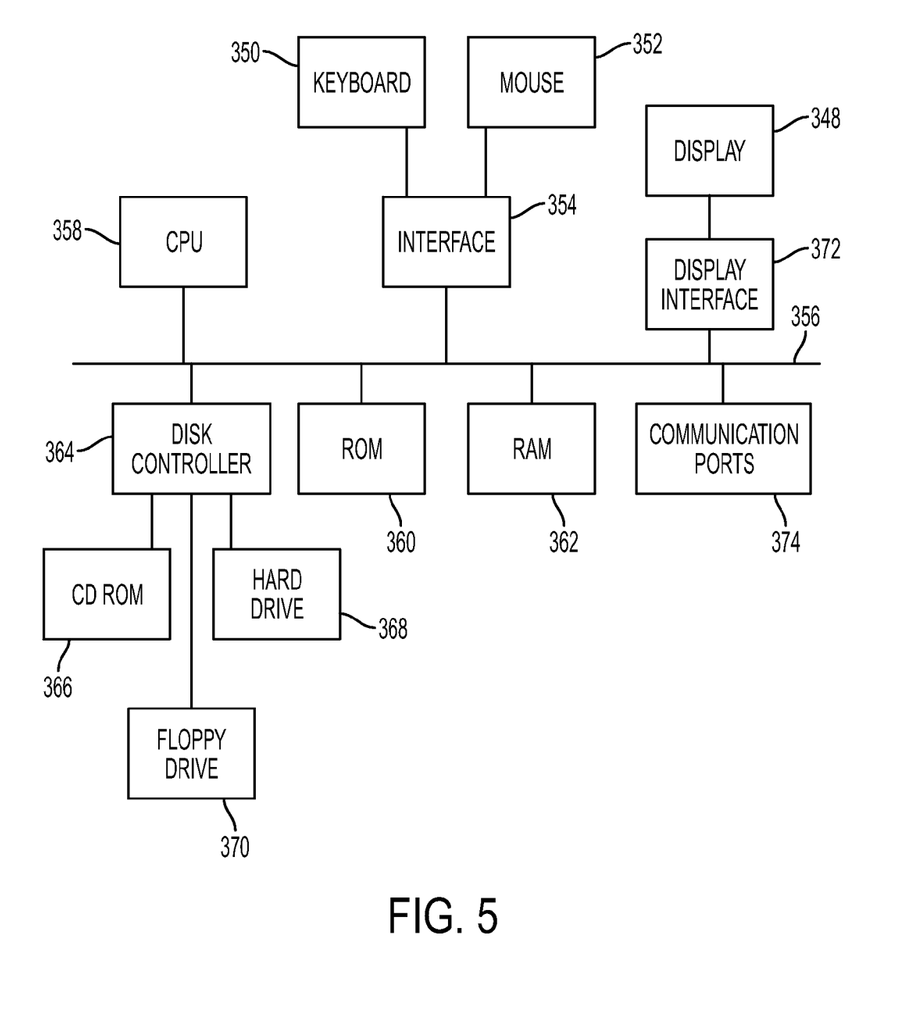
FIG. 5 is a block diagram of exemplary hardware that may be used to contain and/or implement the program instructions of a system embodiment.

In another embodiment, term sets can be extracted from the distance matrix by thresholding. The distance matrix can be represented as a graph where each term is a node and the distances between terms are weights on edges between respective nodes. This is shown in FIG. 5a. If we wish all terms whose distance between them is less than a threshold t=0.05, we remove all edges with weight greater than t as shown in FIG. 5b. This results in two connected components or term sets. These connected components are extracted algorithmically by methods known in the art. If we set a higher threshold t=0.10, the resulting graph and connected components are shown in FIG. 5c. FIG. 5c shows three connected components that produce the term sets {toner, puffs}, {memory, crashes} and {XP, spooler}.

If we set a higher threshold of t=0.15 we get the graph shown in FIG. 5d. In FIG. 5d, there are two connected components corresponding to the two term sets {toner, puffs} and {XP, spooler, memory, crashes}. The latter term set is formed by the merging of the term sets {XP, spooler} and {memory, crashes} obtained at threshold t=0.10. The term set {XP, spooler, memory, crashes} represents a broader concept than either one of {XP, spooler} or {memory, crashes}. It can be seen that the higher the threshold, the broader the concepts that are extracted from the distance matrix or corresponding graph. A user or analyst can control the breadth of searching by selecting a higher or lower threshold to obtain respectively broader or narrower concepts and term sets.

As part of a service support system, in an embodiment each document may include a log written by product support staff describing a problem. There may be more than one problem described in a log. Each concept may correspond to a problem with a product or a piece of equipment, part or human action in a process. It is desirable to retrieve documents corresponding to concepts. In an embodiment, each concept corresponds to a term set. The number of times the terms in the term set occur in each document may be tallied. In a retrieval system, the term set may be entered into a retrieval system that returns the documents containing some or all of the terms in the term set and displayed in decreasing order.

In the following example, a corpus consists of about 1,200 logs from a customer support. Each log is uniquely identified by a number. The task is to determine salient problems. Displayed are: the terms forming the connected component (the term set) in the distance matrix, the number of documents containing any of the terms in the term set, and a few of the documents occurring in the cluster, ranked by the frequency of occurrences of terms in the term set.

Term set: {crash spooler}
6 documents in cluster:
204789056 3
406538483 3
918189799 3
161234686 2
128936613 2
307602518 2
Term set: {spooler crashes XP}
29 documents in cluster:
204789056 3
406538483 3
918189799 3
307602518 2
128936613 2
161234686 2
750826707 4
Term set: spooler driver windows crashes printers crash XP
45 documents in cluster:
918189799 3
406538483 3
204789056 3
161234686 2
307602518 2
128936613 2
To get an idea of how well the term sets and log texts relate, here are fragments of two logs that occur in all the clusters:
Fragment of log 918189799:

"Rob unable to load the latest driver from the web or the driver from his CD on either his laptop or one of the customer's workstations. He was looking for Alex but just missed him. The customer does have several XP and Win2000 workstations that the driver will load on. On the laptop and the other workstation, the driver is crashing the spooler. When he restarts the window, the printer is there but, when selected, he gets a general protection fault."

Fragment of log 406538483:

"Windows spooler crashes loading XP driver - - - Recreation Steps and Problem Details . . . * Load driver version x.xx.x.x for Windows XP off the web. When the PC has or had many different printers loaded on it, the Windows spooler will crash."

In an embodiment, the terms in the concept set may be semantically meaningful and may readily identify the concept. Documents containing the terms of a concept set may be clustered together 140. Clustering may include, for example, tallying and/or ranking documents according to the number of terms in a concept they contain. Documents may be rank ordered within each cluster according to the number of occurrences of terms in a concept set 145 and presented to a user in a format corresponding to the rank order as seen the previous example. Thus, in this example, documents having terms relating to a specific problem may be quickly identified based on the rank order or clustering of relevant terms. Alternatively, problems may be identified based on an identification of terms having high numbers of occurrences in a concept set.

FIG. 6 is a block diagram of exemplary hardware that may be used to contain and/or implement the program instructions of a system embodiment. Referring to FIG. 6, a bus 328 serves as the main information highway interconnecting the other illustrated components of the hardware. CPU 302 is a central processing unit of the system, performing calculations and logic operations required to execute a program. Read only memory (ROM) 318 and random access memory (RAM) 320 constitute exemplary memory devices.

A disk controller 304 may interface with one or more optional disk drives to the system bus 328. These disk drives may be external or internal memory keys, zip drives, flash memory devices, floppy disk drives or other memory media such as 310, CD ROM drives 306, or external or internal hard drives 308. As indicated previously, these various disk drives and disk controllers are optional devices.

Program instructions may be stored in the ROM 318 and/or the RAM 320. Optionally, program instructions may be stored on a computer readable medium such as a floppy disk or a digital disk or other recording medium, a communications signal or a carrier wave.

An optional display interface 322 may permit information from the bus 328 to be displayed on the display 324 in audio, graphic or alphanumeric format. Communication with external devices may optionally occur using various communication ports 326. An exemplary communication port 326 may be attached to a communications network, such as the Internet or an intranet.

In addition to the standard computer-type components, the hardware may also include an interface 312 which allows for receipt of data from input devices such as a keyboard 314 or other input device 316 such as a remote control, pointer and/or joystick. A display including touch-screen capability may also be an input device 316. An exemplary touch-screen display is disclosed in U.S. Pat. No. 4,821,029 to Logan et al., which is incorporated herein by reference in its entirety.

An embedded system may optionally be used to perform one, some or all of the operations of the methods described. Likewise, a multiprocessor system may optionally be used to perform one, some or all of the methods described.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A computerized method of analyzing a plurality of documents, comprising:
   collecting and filtering terms from a plurality of documents;
   identifying a term-frequency vector for each of the documents;
   identifying a term-frequency matrix using the term-frequency vector, wherein rows of the term-frequency matrix comprise values for the term-frequency vectors;
   projecting the term-frequency matrix onto a lower dimensional space using latent semantic analysis, to create a transformed term matrix;
   developing a correlation matrix comprising columns and rows corresponding to terms of the transformed term matrix, and a plurality of elements each having a correlation value indicating a statistical relationship exclusively between two of the terms;
   converting the correlation values to distance values;
   creating a concept graph of connected components using the distance values that are greater than or less than a concept threshold, where each connected component is a concept set of terms that corresponds to a concept; and
   clustering documents that contain the terms of the concept set together.

2. The method of claim 1, wherein the filtering is performed with reference to a set of stop words.

3. The method of claim 1, wherein the method uses a processor and memory, and the plurality of documents is stored in the memory.

4. The method of claim 1, wherein the set of term-frequency vectors for the documents is maintained as rows and columns in a term-frequency matrix.

5. The method of claim 1, wherein a concept comprises highly correlated terms.

6. The method of claim 1, wherein terms of the correlation matrix comprising a correlation higher than the concept threshold become vertices of a concept graph.

7. The method of claim 1, further comprising ranking the documents within each cluster according to the number of occurrences of concept terms within a term set.

8. The method of claim 1, wherein singular value decomposition is used to express the term-frequency matrix as a product of at least three matrices.

9. The method of claim 7, wherein the at least three matrices include a document matrix, a diagonal matrix of eigenvalues, and a term matrix.

10. The method of claim 8, wherein the entries of the diagonal matrix are the eigenvalues of the term-frequency matrix in decreasing order, and
    wherein the rows of the term matrix comprise vectors corresponding to term frequencies in a transformed space.

11. The method of claim 9, wherein dimensionality reduction is performed by trimming the matrices in the decomposition by selecting the m greatest diagonal elements of the diagonal matrix in the composition and selecting the m corresponding rows of the term matrix and multiplying a trimmed diagonal matrix by a trimmed term matrix.

12. The method of claim 1, wherein the entries of the correlation matrix are values from about −1 to about 1.

13. The method of claim 1, wherein the concept threshold is less than or equal to 1, and terms that have correlation higher than the concept threshold form the vertices of the concept graph.

14. A computerized method of determining product problems from field service logs, comprising:
   collecting and filtering terms from a plurality of service logs;
   identifying a term-frequency vector for each of the logs;
   identifying a term-frequency matrix using the term-frequency vector, wherein rows of the term-frequency matrix comprise values for the term-frequency vectors;
   projecting the term-frequency matrix onto a lower dimensional space using latent semantic analysis, to create a transformed term matrix;
   determining a correlation matrix comprising columns and rows corresponding to terms of the transformed term matrix, and a plurality of elements each having a correlation value indicating a statistical relationship exclusively between two of the terms;
   converting the correlation values to distance values;
   creating a concept graph of connected components using the distance values that are greater than or less than a concept threshold, where each connected component comprises a concept set of terms that corresponds to a concept;
   clustering documents that contain terms of the concept set together;
   ranking logs in the documents that were clustered by frequency of occurrence of terms in the concept set.

15. The method of claim 14, further comprising identifying one or more logs that relate to a product problem based on the ranking of the log or logs.

16. The method of claim 14, further comprising identifying one or more problems based on the frequency of occurrence of terms in the concept set.

17. A computerized method of analyzing a plurality of documents, comprising:
   collecting and filtering terms from a plurality of documents;
   identifying a term-frequency vector for each of the documents;
   identifying a term-frequency matrix using the term-frequency vector, wherein rows of the matrix comprise values for the term-frequency vectors;
   projecting the term-frequency matrix onto a lower dimensional space using latent semantic analysis, to create a transformed term matrix;
   developing a correlation matrix comprising columns and rows corresponding, to terms of the transformed term matrix, and a plurality of elements each having a correlation value indicating a statistical relationship exclusively between two of the terms;
   creating a dendrogram of related concepts using a function of the correlation matrix;
   identifying branches of the dendrogram corresponding to related concepts; and
   clustering documents that contain concept term sets together.

18. The method of claim 17, wherein the filtering is performed with reference to a set of stop words.

19. The method of claim 17, wherein the method uses a processor and memory, and the plurality of documents is stored in the memory.

20. The method of claim 17, further comprising ranking the documents within each cluster according to the number of occurrences of concept terms within a term set.

* * * * *